US007487013B2

(12) United States Patent
Miklos

(10) Patent No.: US 7,487,013 B2
(45) Date of Patent: Feb. 3, 2009

(54) LOGISTICS SYSTEM TO SUPPORT DEPLOYED ASSETS WITH OVER THE HORIZON CONNECTIVITY

(75) Inventor: Troy A. Miklos, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 602 days.

(21) Appl. No.: 10/966,322

(22) Filed: Oct. 15, 2004

(65) Prior Publication Data
US 2008/0208397 A1    Aug. 28, 2008

(51) Int. Cl.
*G01C 23/00* (2006.01)
*G06F 7/00* (2006.01)
(52) U.S. Cl. ......................................................... 701/3
(58) Field of Classification Search ...................... 701/3, 701/14–16, 29, 34, 36; 340/425.5, 945, 963, 340/438
See application file for complete search history.

(56) References Cited
U.S. PATENT DOCUMENTS
4,726,224 A * 2/1988 D'Ausilio ..................... 73/167

| 5,111,402 A | * | 5/1992 | Brooks et al. ................. 701/35 |
| 5,931,877 A | * | 8/1999 | Smith et al. ................... 701/29 |
| 7,035,585 B2 | * | 4/2006 | Forman et al. ............. 455/3.02 |

* cited by examiner

*Primary Examiner*—Yonel Beaulieu
(74) *Attorney, Agent, or Firm*—Bracewell & Giuliani LLP

(57) ABSTRACT

A logistic systems to support deployed platforms that includes a reporting system located within deployed assets, an over-the-horizon (OTH) communication system, an information distribution node, a logistics control system, and a servicing activity. The reporting system located within deployable assets monitors and reports deployed asset status information using the OTH communication system. Thus, the reporting system passes deployed asset status information to the logistics controller via the information distribution node. The logistics controller receives deployed asset status information and allocates the necessary resources to service the deployed asset based on received deployed asset status information. This allocation of resources is coordinated at the servicing activity or service depot in communication with the logistics controller prior to the arrival of the deployed asset saving valuable time.

35 Claims, 9 Drawing Sheets

LOGISTICS SYSTEM TO SUPPORT DEPLOYED ASSETS WITH OVER THE HORIZON CONNECTIVITY

TECHNICAL FIELD OF THE INVENTION

The present invention relates generally to logistic systems, and more particularly, a real-time logistics management system to gather the status of deployed platforms and stage resources to service the deployed platform at a service depot.

BACKGROUND OF THE INVENTION

Current vehicle maintenance practices require operators to return the vehicle to a maintenance location (if possible) prior to beginning the maintenance process. This process normally requires oral reporting which may be entered into a database before actual maintenance activities begin. Additionally, current logistic practices for re-supplying vehicles with consumables such as fuel, oil, oxygen, and expendables such as in the case of tactical aircraft or tactical units, ordinance, chaff, flares, or other like known expendables, require manual database input and are not initiated until a vehicle returns to the servicing location. This manual process results in a time delay between the use and accounting of the consumables and expendables. This delay in turn further delays the re-supplying or servicing vehicles.

Additionally, mechanical faults experienced in the field are typically not reported until a vehicle or other unit returns from the field to its servicing depot. Once the asset has been returned from operation in the field to the servicing depot, maintenance faults and diagnostic programs may be run in order to isolate faults associated with individual components or modules within the asset. This also results in delay and slower returns to service as the asset must continue to operate with the fault until identified at the servicing depot with analysis by a diagnostic team to determine the source of the fault.

Newly fielded communication systems often provide unpredicted utility in ways never envisioned by the original planners. Long-range communication capabilities provided by emerging commercial satellite communication (SATCOM) systems have improved effectiveness of these communications. For example, in operations with forward air controllers of Special Forces, commercial SATCOM offers the potential for extended and enhanced communications with deployed assets. Current UHF radio systems allow terrain to mask low-elevation-angle, line-of-sight, direct communications with in-bound tactical aircraft. In this case, information will not be available until UHF communications are established as the tactical aircraft approach the servicing area.

Therefore, a need exists for a system and method with which to more timely coordinate the servicing of vehicles or other assets returning from a sortie or mission.

SUMMARY OF THE INVENTION

The present invention provides logistic systems to support deployed platforms that substantially address the above identified needs and others. More specifically, the present invention provides a real-time logistics management system. This system includes a reporting system located within deployed assets, an over-the-horizon (OTH) communication system, an information distribution node, and a logistics control system. The reporting system, located within deployable assets, is operable to monitor and report deployed asset status information. The OTH communication system may include deployed satellite communication (SATCOM) transceivers operable to wirelessly couple to a reporting system to SATCOM service. The OTH communication system couples to the reporting system and allows the reporting system to pass deployed asset status information to the logistics controller via the information distribution node. The logistics controller receives deployed asset status information from the information distribution node and allocates the necessary resources to service the deployed asset based on received deployed asset status information. This allocation of resources is coordinated at the service depot in communication with the logistics controller prior to the arrival of the deployed asset at the service depot. This advanced work saves valuable time and reduces the required time to service the deployed asset.

Further embodiments may allow the reporting system to receive status inquires initiated by the logistics controller or servicing activity regarding the deployed asset status information. The reporting system may then gather the requested deployed asset status information in response to the inquiry. Then, the reporting system prepares and sends a response to the status inquiry to the logistics controller via the OTH communication system and information distribution node. Status information may include information regarding the status of consumables and expendables onboard the deployed asset as well as the status and diagnostic results of asset subsystems.

The logistics controller, by analyzing the deployed asset status information, gathers and prioritizes available resources to service the deployed asset before the deployed asset evens returns to the service depot. This capability allows the service depot to stage the resources to service the deployed asset before the deployed asset returns to the service depot. This capability greatly reduces the time required to service a returning deployed asset by allowing material and manpower to be scheduled proactively prior to the arrival of the deployed asset at the service depot.

Additionally, the logistics controller may initiate the re-supply of inventory within the logistics system based on the resources utilized by the deployed asset as contained in the deployed asset status information. These deployed assets may include tactical aircraft, tactical land and naval vehicles, as well as deployed assets. This logistics system may also be applied to other enterprises utilizing fleets of vehicles which require ongoing maintenance and service. By applying the teachings of the present invention, downtimes associated with individual deployed assets are minimized while increasing the enterprise's ability to respond to demands.

Another embodiment provides a logistic management system that includes a reporting system information distribution node, an OTH communication system, a service depot, and a logistics controller whose collective functions are to facilitate the service of returning deployed assets. The information distribution node communicatively couples via the OTH communication system to reporting systems located within deployed assets. This allows an exchange deployed asset status information between the logistics management system and the deployed asset.

The logistics controller receives the deployed asset status information from the information distribution node and may analyze the deployed asset status information in order to allocate resources to service the deployed asset based upon the received deployed asset status information. A service depot services the returning deployed assets and receives instructions from the logistics controller. Receiving and analyzing deployed asset status information and allocating and staging resources to service the deployed asset occurs prior to the arrival of the deployed asset at the service depot.

These functions, which occur prior to the arrival of the returning deployed asset at the service depot, significantly reduce the turnaround time associated with servicing the deployed asset. Additionally, automated portions of the logistics system allow inventories of consumables and expendables utilized by the deployed assets to be automatically maintained at serviceable levels without delaying the return to service of the deployed asset. The logistics controller may track historical deployed asset maintenance information and provide preventative maintenance service recommendations to maintenance users that service the deployed asset.

Another embodiment provides a method to service a plurality of deployed assets. This method includes gathering deployed asset status information with the aid of an onboard reporting system communicatively coupled to the deployed asset. The onboard reporting system communicatively couples to an information distribution node via an OTH communication system. The OTH communications system may be augmented by a tactical or line-of-sight (LOS) communications system. In turn, the information distribution node communicatively couples with a logistics controller. These communicative couplings allow deployed asset status information and inquiries to be exchanged between the logistics controller and onboard reporting system via the information distribution node. By analyzing deployed asset status information, the logistics controller may allocate resources to service the deployed asset based on the received deployed asset status information from this and other deployed assets. This allocation of resources is coordinated prior to the arrival of the deployed asset at the service depot allowing necessary equipment to be staged prior to servicing the deployed asset.

Additionally, inquiries may be initiated into the status of the deployed asset with the logistics controller requesting deployed asset status information or the performance of diagnostics to begin troubleshooting asset problems before arrival. The deployed asset, via the onboard reporting system, can gather the deployed asset status information and communicate a response back to the logistics controller via the OTH communication system and information distribution node.

The present invention provides an important technical advantage by presenting enhanced two-way communication capability. Two-way communication is possible because the onboard transceiver can both send and receive data from a commercial satellite network.

Another technical advantage avoids the limitations of traditional line-of-sight communications methods. Terrains that often block low-elevation-angle line-of-sight communications can be overcome by allowing users, such as a ground unit, to relay information between tactical aircraft and logistic management activities. Because satellite communications are used, low-elevation-angles are avoided. A corollary advantage of extending communication beyond line-of-sight or over-the-horizon is that data acquisition can occur much earlier.

Yet another advantage provided by the present invention is to allow increased real-time communication while an aircraft is en-route. Servicing activities are able to communicate data in real-time. Thus, the servicing activity has an increased awareness of required maintenance and repairs for the assets. This allows logistic coordinators and servicing activities to assimilate and assess situational data and perform advanced planning.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGs., like numerals being used to refer to like and corresponding parts of the various drawings.

Tremendous satellite communication capacity is available for data, voice and video communications. Leveraging this capability may extend communication capability to over-the-horizon (OTH) for line-of-sight (LOS) users who have not had access to such capability. The available equipment is currently light weight and easily installed in vehicles. The present invention provides status details from deployed assets that can be relayed to a maintenance leader maintainer located within a service depot before the asset returns. This allows currently underutilized time at the service depot spent waiting for vehicles and units to return from service to be more effectively utilized. This allows the operations tempo of deployed assets to be increased and improve management of resources associated with servicing deployed assets. Thus, the service depot is able to collect and stage or schedule necessary resources (manpower and equipment) to service the returning deployed assets prior to their arrival.

Figure 1:
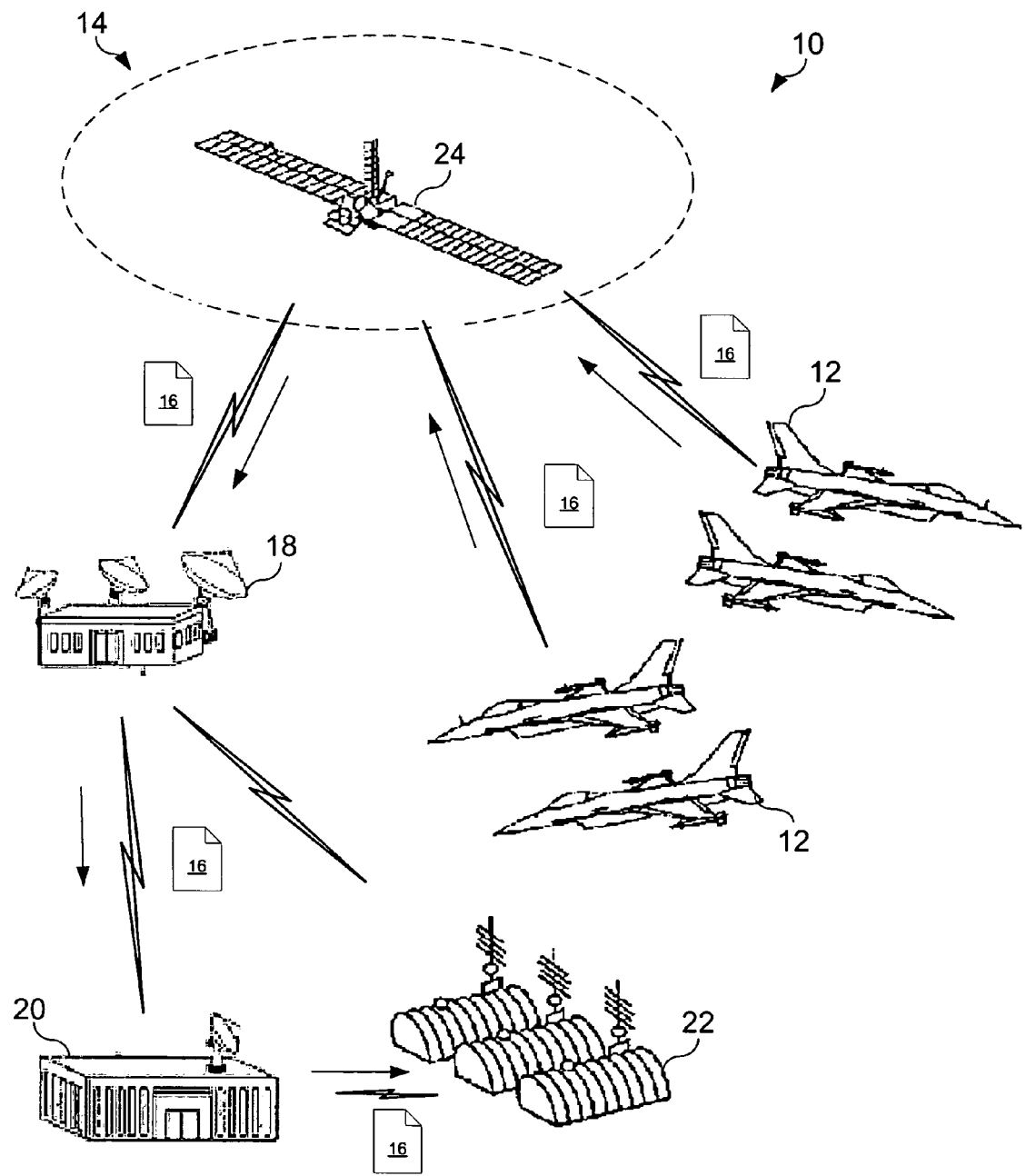
FIG. 1 depicts a logistics management system that coordinates the servicing of deployed assets with servicing activities in accordance with one embodiment of the present invention.

FIG. 1 provides a graphic illustration of one embodiment of the present invention. Here, real-time logistics management systems 10 services deployed assets 12 and service depot 22. Deployed assets 12 utilize over-the-horizon (OTH) communication system 14 to pass deployed assets status information 16 to information distribution node 18. Logistics controller 20 and servicing depot 22 both may be communicatively coupled to information distribution node 18. OTH communication systems 14, such as a satellite (SATCOM)

service, provide OTH connectivity from deployed asset 12 to a servicing maintenance facility, such as service depot 22. Previously, only line-of-sight (LOS) communication was available and normally limited in range to approximately 30 miles. Logistics management system 10 uses an onboard reporting system within deployed units 12 to gather and report deployed assets information 16 to servicing depot 22. OTH communication system 14 may utilize satellite 24. A more detailed view of one available commercial satellite network is provided in FIG. 2. Deployed assets information 16 is forwarded by information distribution node 18 to logistics controller 20 which then forwards the information directly to servicing depot 22. At servicing depot 22, logistics controller 20 may automatically begin to allocate resources to service deployed asset 12 based on received deployed assets status information 16. It is important to note that this occurs before deployed asset 12 physically returns to servicing depot 22. Additionally, service depot 22 may communicate with deployed asset 12 to perform diagnostics that further identify the needs of deployed asset 12.

Figure 2:
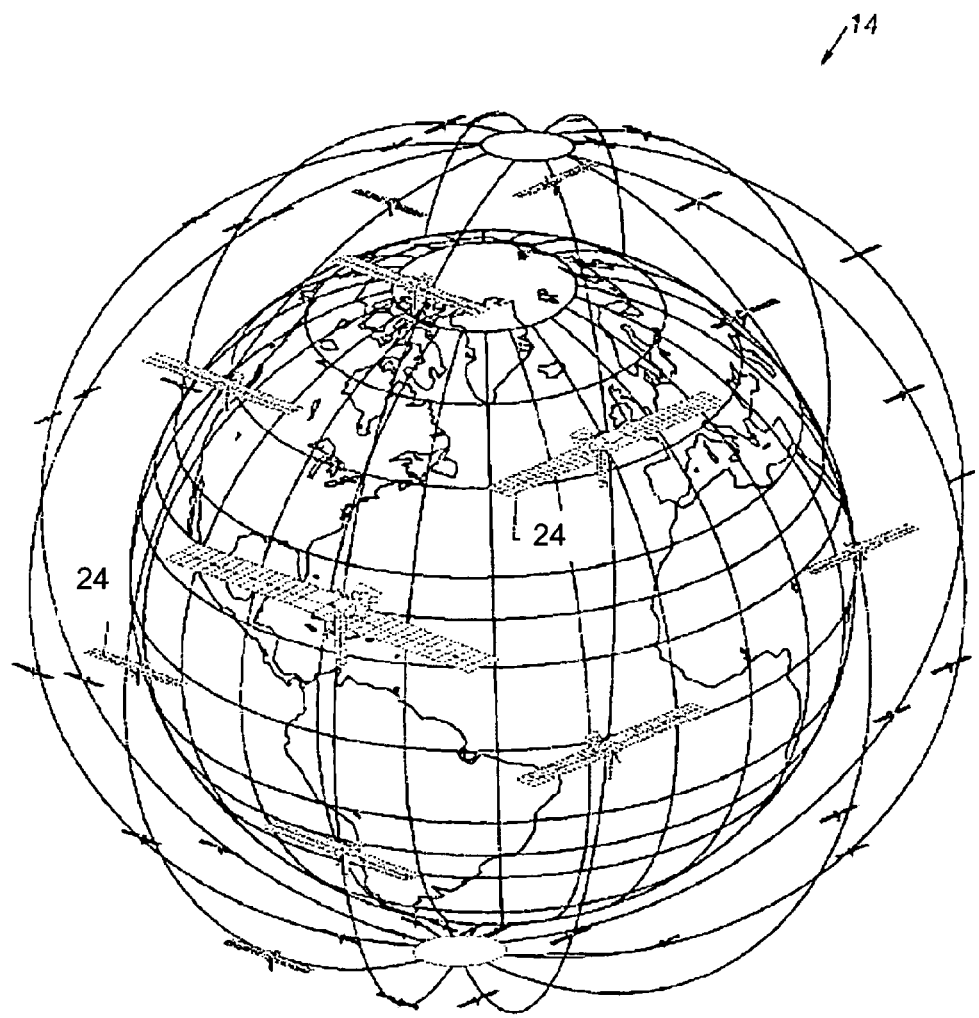
FIG. 2 depicts a satellite constellation to communicatively couple deployed assets and servicing activities in accordance with one embodiment of the present invention.

FIG. 2 shows a more detailed view of a commercial satellite network. OTH communication systems 14 may take the form of a satellite network having constellation of low earth orbiting satellites. Each satellite 24 in the illustrated constellation is interconnected to its neighbors by high-speed cross links. Satellites 24 form an orbiting network that allows communications to be established across large distances. Some areas not accessible to more conventional communications are accessible via satellites 24. Several commercial satellite systems are available including, but not limited to, ECCO, Ellipso, E-Sat, FAISAT, Globalstar, ICO Iridium, LeoOne, ORBCOMM, SkyBridge and Teledesic. Using these established systems is particularly advantageous because the only user costs for these satellites are borne for used bandwidth. Additionally, such commercial satellite networks have significantly greater available bandwidth than Military SATCOM networks.

There are many emerging satellite communication systems that may have applicability for integration into deployed assets, such as tactical aircraft. Low- and Medium-earth Orbi (LEO/MEO) systems as well as Geosynchronous Orbit (GEO) systems may be integrated into tactical aircraft. These systems provide low-cost, low bandwidth services (i.e., voice, data, fax and paging). Therefore, the equipment required to receive these services is generally low weight, low cost, and requires only a small, omni-directional antenna. GEO systems provide high bandwidth data services (e.g., Internet access, multimedia, video teleconferencing, etc.) and generally require large, stabilized, and steerable antennas and are more suitable for larger assets. Therefore, some embodiments within deployed assets, such as tactical aircraft, focus on LEO and MEO communications systems.

Information on various satellite communication systems is provided in TABLE 1. Table 1 presents system type, architecture, bandwidth, earth coverage, operating frequency, multiple access scheme, security provisions, signal propagation delay, etc. Top-level analyses performed on the systems indicate how well they met the potential requirements based on the information collected. Analysis indicated that the voice and data messaging systems (ECCO, Ellipso, Globalstar, ICO, and Iridium) are best suited for tactical airborne applications. Iridium is also the first commercial LEO SATCOM system to become operational that supports both voice and data.

TABLE 1

NEAR TERM LEO/MEO COMMERCIAL SATCOM SYSTEMS

| System | Type | Primary Usage | Earth Coverage | Data Rate | Freq. Band | Multiple Access |
|---|---|---|---|---|---|---|
| ECCO | LEO | Voice, Data, Fax, GPS | 70° S to 70° N | 9.6K | L/S | CDMA |
| Ellipso | MEO | Voice, Data, Fax, GPS | 40° S to 70° N | 9.6K | L/S | CDMA |
| E-Sat | LEO | Remote Monitoring | North America | — | VHF | CDMA |
| AirSAT | LEO | E-Mail, Voice-Mail, Alerts | 70° S to 70° N | 19.2K | VHF | TDMA |
| Globalstar | LEO | Voice, Data, Fax, Paging | 70° S to 70° N | 9.6K | L/S | CDMA |
| ICO | MEO | Voice, Data, Fax | Global | 38.4K | L | TDMA |
| Iridium | Leo | Voice, Data, Fax, Paging | Global | 2.4K | L | TDMA |
| LeoOne | LEO | Vehicle, Tracking, Monitoring | 65° S to 65° N | 9.6K | VHF/ UHF | FDMA/ TDMA |
| ORBCOMM | LEO | E-Mail, Tracking, Monitoring | Global | 2.4K | VHF/ UHF | FDMA/ TDMA |
| SkyBridge | LEO | Interactive Multimedia | 68° S to 68° N | nx2M | Ku | — |
| Teledesic | LEO | Interactive Multimedia | Global | 64M | KA | TDMA |

AIRSAT uses current off-the-shelf equipment that provides Iridium SATCOM communications services for commercial aviation applications. AIRSAT 1 has several major advantages over the other airborne SATCOM communications systems. The Iridium satellite constellation offers true worldwide coverage and complete interoperability with Public Switched Telephone Networks (PSTNs) worldwide. AIRSAT system is also light weight (i.e., less than 20 pounds of the entire installation package) and can be deployed and distributed to coalition force members without concern for security or technology loss.

AIRSAT has demonstrated on various aircraft and in a variety of mission applications, the ability to provide service in the northern latitudes. Additionally, NASA installed the AIRSAT to maintain crew communications with aircraft that operated beyond the reach of LOS communication systems.

Figure 3:
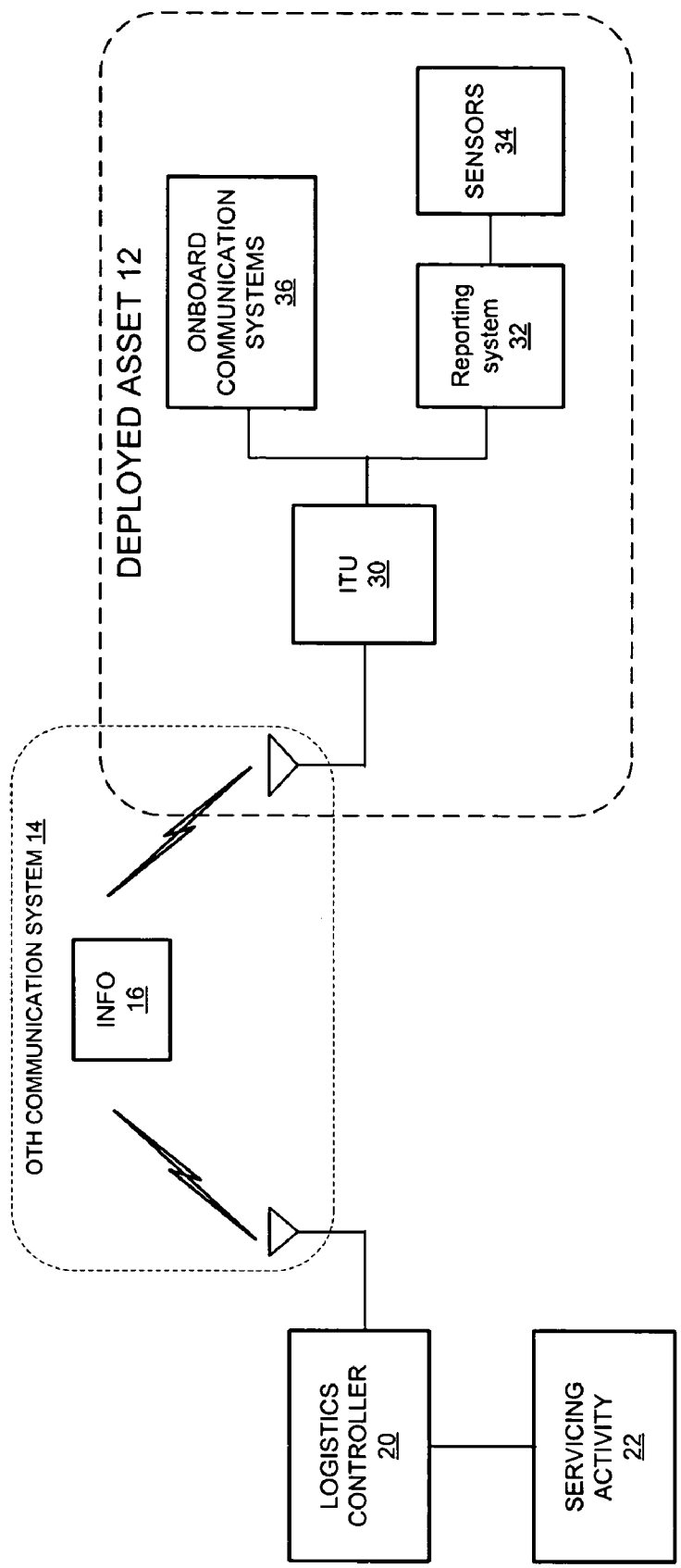
FIG. 3 provides a block diagram that depicts an onboard data gathering system in accordance with the present invention.

The onboard reporting system shown in FIG. 3 utilizes OTH communication interfaces, such as SATCOM transceivers 30 that couple to reporting system 32. This allows SATCOM transceiver 30 and reporting system 32 to perform two-way communications utilizing OTH communication system 14. These communications include both data exchanges between the reporting system 32 and logistics controller 20 as well as audio and video communications exchanged using onboard communication system 36. Furthermore, reporting system 32 may couple to various sensors 34 and control systems to monitor or perform diagnostics or various subsystem statuses on board deployed asset 12. In addition to passively gathering data relating to the status of deployed asset 12, onboard reporting system 32 may, on its own initiative or in response to a status inquiry received from logistics controller 20, gather additional deployed asset status information 16. This information is then passed back to logistics controller 20 in the form of a response.

Another embodiment incorporates fault detection and diagnostics within logistics controller 20, reporting system 32, or other like processors. These processors may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory coupled to the processor may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processor implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processor executes, operational instructions corresponding to at least some of the steps and/or functions illustrated in FIGS. 8 and 9.

This allows the detection and testing of fault conditions within deployed asset 12 prior to it returning to service depot 22. The fault condition detected may determine the need to perform diagnostics while operating to better identify the cause of the fault condition as opposed to recreating the fault condition at service depot 22. For this reason, reporting system 32 may exchange real-time two-way data, audio, and/or visual communications with the service depot and/or logistics controller using the OTH communication system. This may allow the fault condition once identified to be further investigated by a logistics controller wherein appropriate diagnostics are identified and requested by the service depot through the logistics controller to the onboard reporting system. Following the completion of these onboard diagnostics, reporting system 32 may gather and forward deployed asset status information 16 to the logistics center and, if necessary, service depot 22. Onboard reporting system 32 may communicate to service depot 22 through OTH communication system 14 which may be replaced or augmented with a LOS communication system.

Deployed asset status information 16 may include information relating to consumables and expendables utilized by the deployed asset as well as asset subsystem status information. The consumables may take the form of, but should not be limited to, fuel, oil, nitrogen, compressed air, oxygen, disposable parts that are utilized by the deployed asset. Expendables may take the form of ammunition, chafe, or other like equipment utilized during the performance of the mission of the deployed asset. Consumables and expendables located within inventory 37 at the service depot level may need to be replaced. Logistics controller 20 may initiate the re-provisioning of inventory 37 from an external supply system 38 based on the actual expended and consumed inventory information provided by deployed asset 12.

In addition to reporting the status of expendables such as fuel, weapons, and defensive counter measuring equipment, the reporting system may also report the status and track the status of various preventative maintenance operations in order to aid operations and maintenance schedulers at the service depot in determining when the deployed asset will be available for the next cycle and what resources should be staged for this service. When maintenance coordinator 26 at the service depot receives deployed asset status information 16, the maintenance cycle can commence even prior to the arrival of the deployed asset at the service depot. The maintenance control activity can order parts, identify pertinent instructions and tools, and arrange for a workspace and support equipment for maintenance worker 28. Maintenance worker 28 can then review required procedures and gather the necessary tools and equipment or consult with additional experts as needed. This preparation may be performed with the aid of electronic communication devices. For example, ruggedized portable computing systems may be used by both maintenance coordinator 26 and maintenance worker 28 wherein the pertinent maintenance procedures and technical instructions are provided directly to the ruggedized computer system of maintenance worker 28 based on the received deployed asset status information. This allows more effective use of limited manpower and inventory resources over a sustained period of operations.

Figure 4:
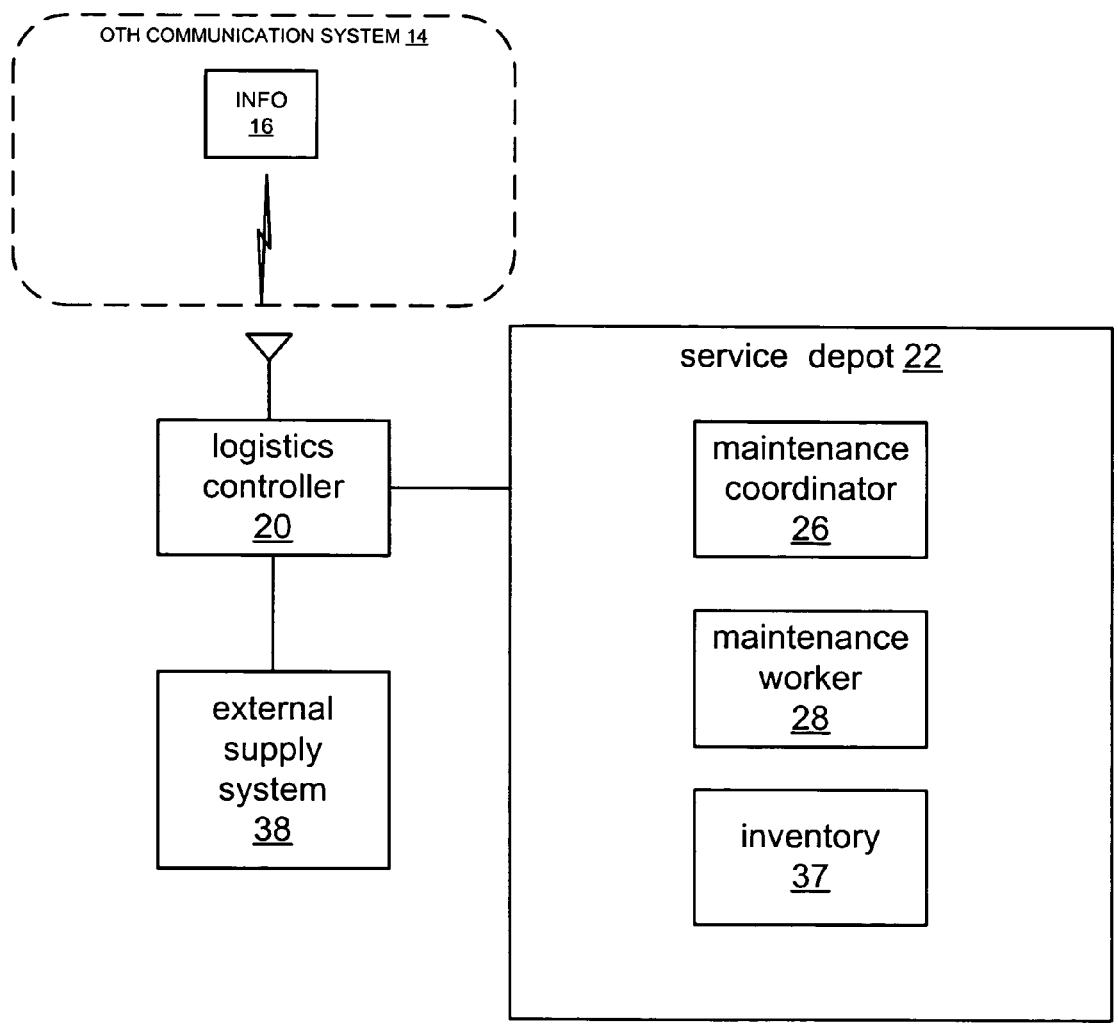
FIG. 4 provides a block diagram that depicts the coordination associated with servicing returning deployed assets in accordance with one embodiment for the present invention.

FIG. 4 provides a block diagram that depicts the coordination associated with servicing returning deployed assets 12. As shown, logistics controller 20 receives deployed asset status information 16 and analyzes this data, which in part is forwarded to service depot 22 where maintenance coordinator 26 reviews deployed asset status information 16 in order to prioritize available resources. These available resources include both physical resources within inventory 36 and manpower resources as illustrated by maintenance workers 28. Additionally, logistics controller 20 or service depot 22, upon analyzing deployed asset status information 16, may determine that it may be necessary to request additional inventory via external supply system 38 to replenish both consumables and expendables expended by deployed asset 12.

Figure 5:
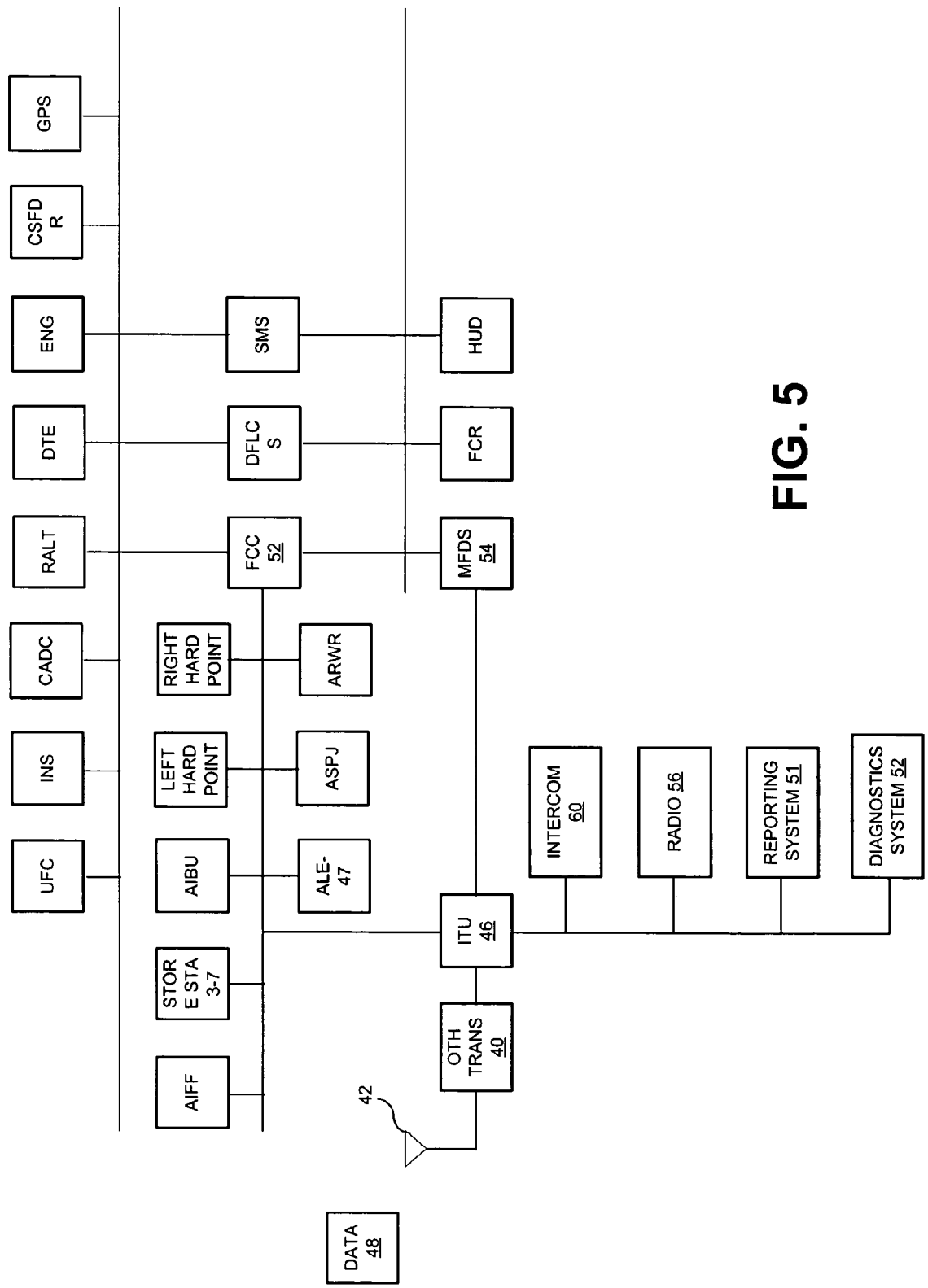
FIG. 5 depicts a specific embodiment where OTH communication technology is coupled to an on board reporting system within a tactical aircraft in accordance with the present invention.

FIG. 5 depicts a specific embodiment where commercial satellite communications technology is coupled to an onboard reporting system within a tactical aircraft OTH communications are received by onboard transceiver 40, via external antenna 42. While only one external antenna 42 is shown, several may be used. By using more than one external antenna 42 in various places on an aircraft's body, transmissions are less likely to be dropped as the tactical aircraft engages in complex and dynamic maneuvers, such as steep climbs or rolls. Onboard transceiver 40 may be a commercial off-the-shelf transceiver, such as the Iridium system's AIRSAT-1 transceiver. By using off-the-shelf technology, exceptional cost savings are achieved. Data can be communicated from onboard commercial transceiver 40 to onboard interface unit 46. Onboard interface unit 46 prepares and processes data 48 which is exchanged with the logistics system via the OTH communications system. Onboard interface unit 46 receives data 48 from an onboard reporting system 51 or for inquiries from the OTH communication system. Other information may also be sent to other components of the onboard communications system. In a tactical aircraft, such as components, may include fire control computer 52, multi-display set 54, radio 56, and intercom 60. If data 48 comprises target data, mission data may be sent to fire control computer 52 via a serial/digital bus. RS-170 video data may be sent to multi-function display set 54 or other like display. SVGA video data is sent to a commercial display. Thus, the OTH communication system allows pilots to be apprised of a tactical and logistics data through standard communications interfaces. Audio data can be exchanged with the pilot via intercom 60 or an improved data modem to radio 56.

Data 48 may be communicated to onboard interface unit 46 from onboard diagnostics/maintenance history system 52. Such data may comprise inventory, maintenance history, and equipment status information associated with onboard subsystems for assessment purposes. Onboard interface unit 46 processes data 48. This data is subsequently sent to OTH transceiver 40. OTH transceiver 40 may then communicate with a satellite network or other like OTH network via external antenna 42. Voice data can be similarly processed from aircraft intercom 60 and radio 56. Because individuals can communicate directly from the field to the servicing activity, situational awareness is greatly increased. Information communicated by on-scene personnel can be used to more effectively determine the service needs of the deployed assets. However, users need not be active in the communications process for the advantages to be achieved.

Figure 6:
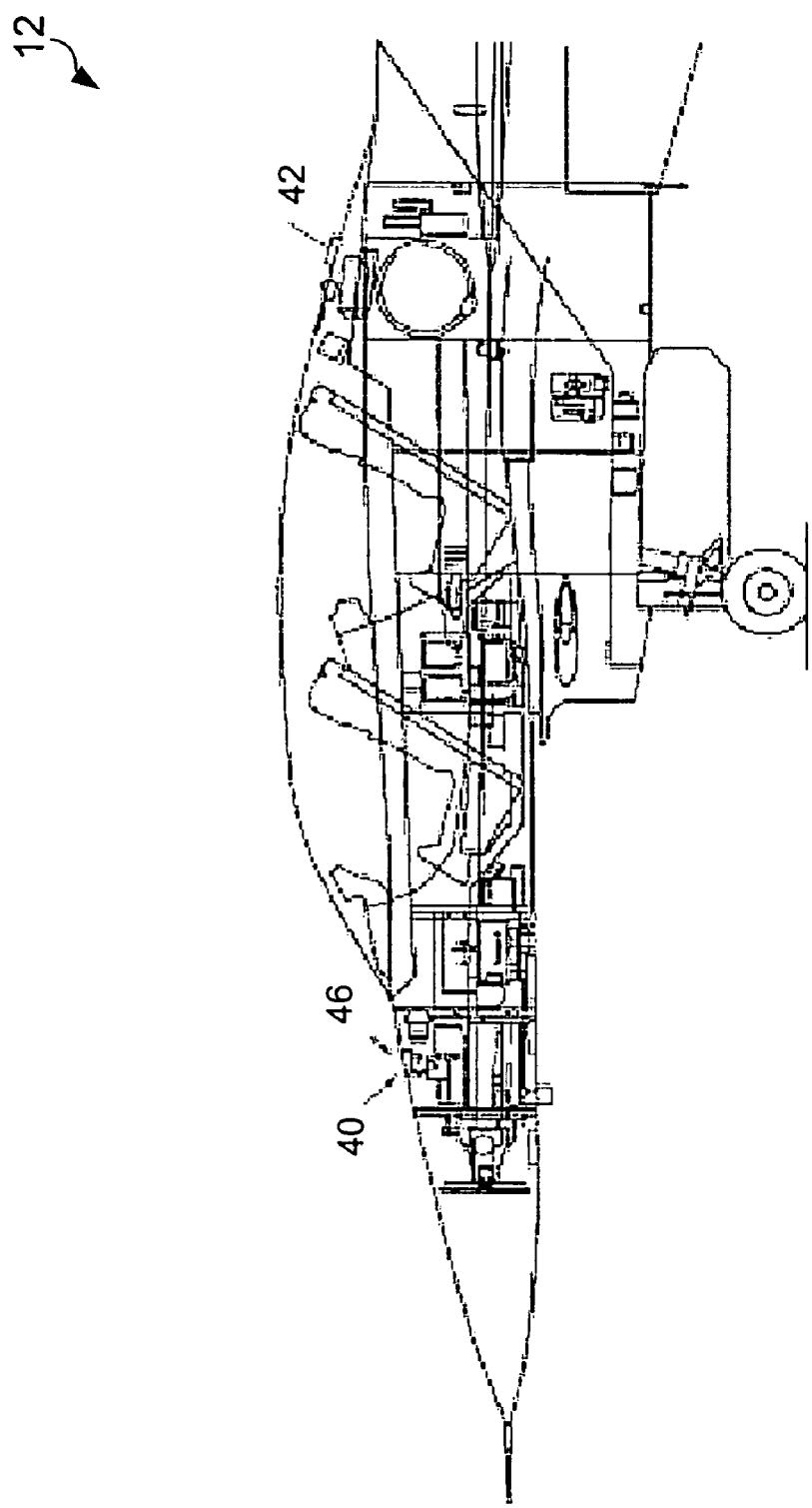
FIG. 6 is an illustration of an embodiment wherein OTH transceiver and the on board reporting system are mounted within a tactical aircraft in accordance with the present invention.

FIG. 6 shows one embodiment that mounts transceiver 40 and onboard interface unit 46 within an aircraft. Because the units are mounted at the front of aircraft the units do not add to cockpit clutter. Antenna 42 can be added to the exterior of aircraft without degrading performance. In order to prevent a loss of signal during maneuvering, multiple antennas may be used at several places on the aircraft's body.

Returning to FIG. 1 aircraft 12 collects data on subsystem statuses and transmits that data through an OTH communication network to a logistics command center 20 which in turn forwards the information to a service activity detailed to service aircraft 12. As aircraft 12 approaches the servicing activity (such as service depot 22) status updates may be passed to the depot via augmenting networks such as LOS communication systems. After the aircraft completes a mission, aircraft 12 may return asset assessment information to logistics command center 20, using satellite network 14. If aircraft 12 were unable to be serviced by a first service depot 22, the aircraft may easily be redirected to a secondary maintenance facility operable to service the craft. This change would be coordinated by the logistics command center.

Figure 7:
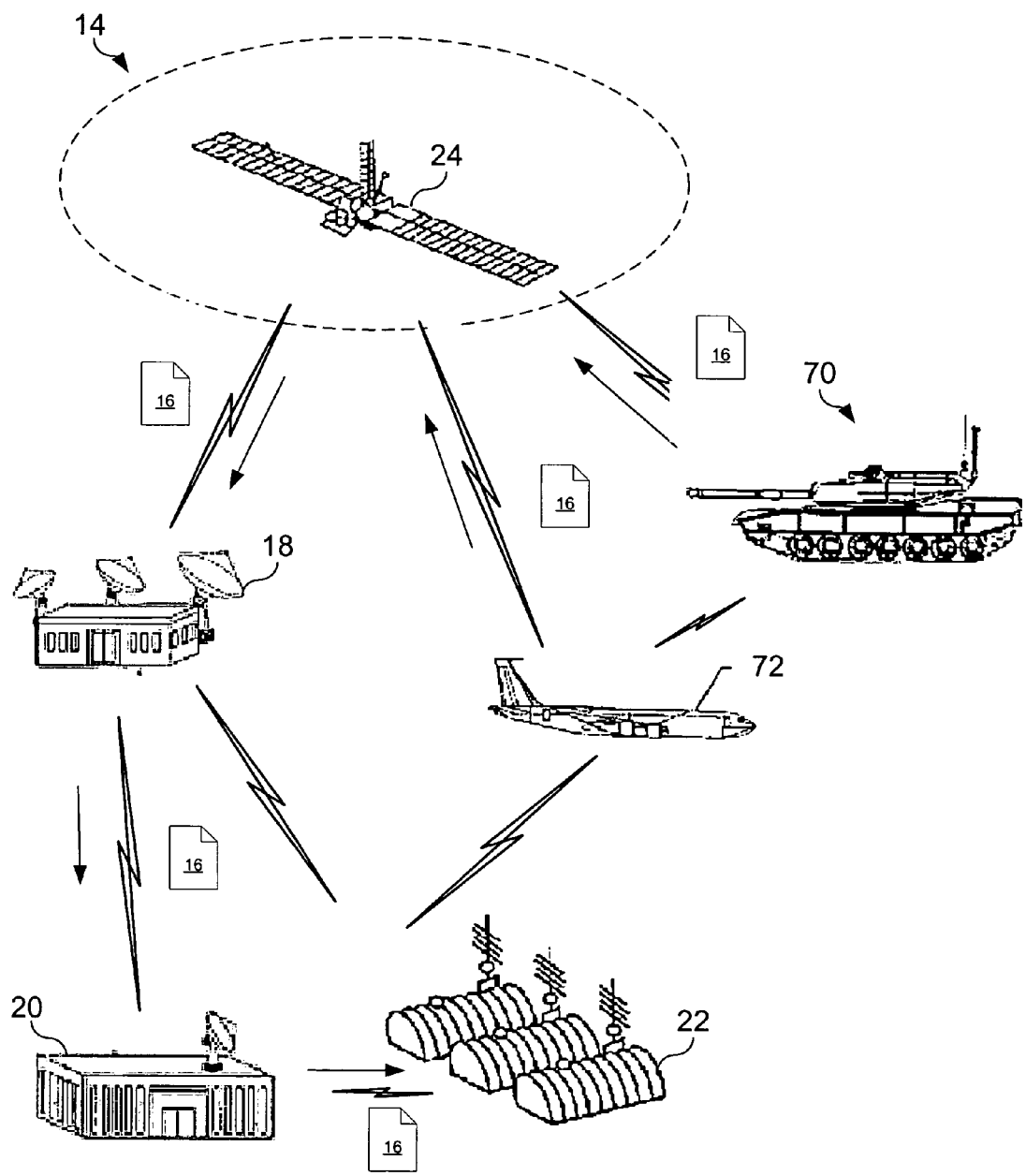
FIG. 7 illustrates an alternative embodiment where the present invention supports ground units in accordance with the present invention.

FIG. 7 illustrates another possible implementation where ground units 70 send reports on their assets (equipment and personnel) to logistics Command Center 20. Logistic Command Center 20 sends the information to depot 22. Information from ground units 70 may be relayed by aircraft 72 either directly to information distribution node 18 or through an OTH communication network that the aircraft or ground unit interfaces to. Because ground units pass real-time data, their immediate needs can be more quickly and more efficiently identified and serviced. Additionally, this network is applicable to a large fleet of vehicles such as those owned by a trucking company, bus company, rail line or shipping company or any combination there of. This would greatly assist in the coordination of repairs and maintenance periods of naval vessels which were previously unable to prioritize and submit their repair requests prior to their return to port. This concept may also be applied to stationary deployed assets which are serviced by mobile servicing units. The logistics controller, in the instance, would be able to coordinate scheduled and unscheduled service and reprovisioning in a more effective manner. Thus, large enterprises can be managed more effectively.

Figure 8:
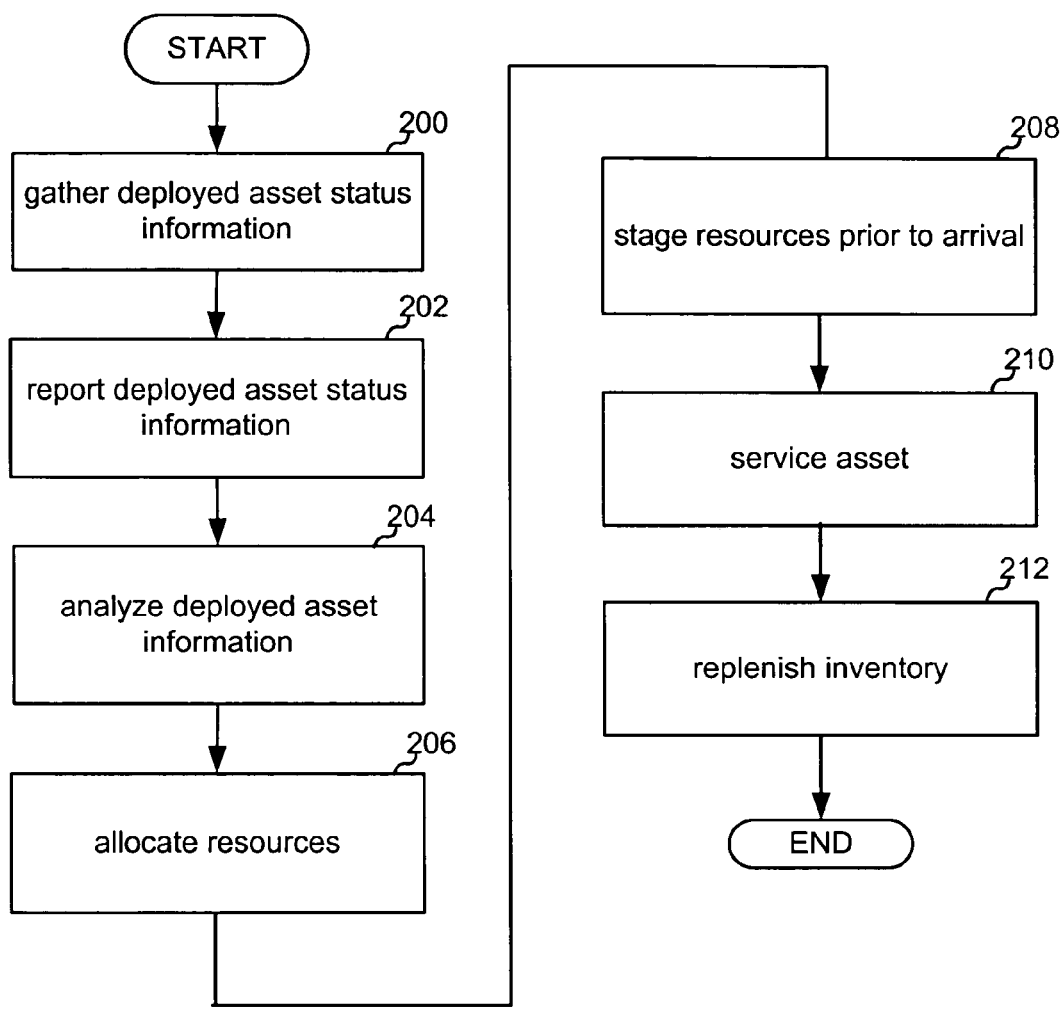
FIG. 8 provides is a logic flow diagram illustrating the processes associated with gathering deployed asset status information and prioritizing and staging resources to service that asset in accordance with the present invention.

FIG. 8 provides a logic flow diagram illustrating the processes associated with servicing deployed assets. In step 200, deployed asset information is gathered from the deployed assets in field or during operations. This may be done with the onboard reporting system as previously discussed. This information is then reported in step 202 to a logistics controller or other information-processing center. Specific events may be reported with the status information as well. These events may include aircraft location, speed, and altitude when an ordinance or countermeasure release occurs, pilot ejection, catastrophic failure, or other like events. This allows recover teams to localize the recovery of the craft and crew. This also allows mobile servicing activities to locate and service the assets in the field. In step 204, analysis is performed on the deployed asset information at the logistics controller and/or service depot level. Should it be necessary for additional information to be gathered in a case of fault isolation, diagnostics, or other like situations, additional information will be gathered as discussed in FIG. 9. Based on the analysis of the deployed asset information in step 204, resources are allocated to service the deployed asset when it returns from operations in step 206. This allocation may take into account prioritization based on the mission of the deployed asset or other like factors. These needed processes include the identification of those resources to service the deployed asset before it returns to the service depot. In which case, once the prioritized resources are identified, the tools, materials, workspace, and other necessary elements are staged to perform the servicing of the deployed asset upon its return to the service depot. Additionally, step 208 includes the generation of appropriate work packages and documentations provided to the maintenance workers that will service the asset and schedule the physical resources. In step 210 the asset is serviced so that it can be returned to operations. Note that the time previously used to identify the required service once the deployed asset arrives is eliminated as this occurs while the asset is in transit to the service depot. Simultaneously the identification of the inventory to be expended on servicing the deployed asset, step 212 initiates the replenishment of inventory at the service depot to maintain predetermined levels of consumables, expendables, and other required resources at the service depot.

Figure 9:
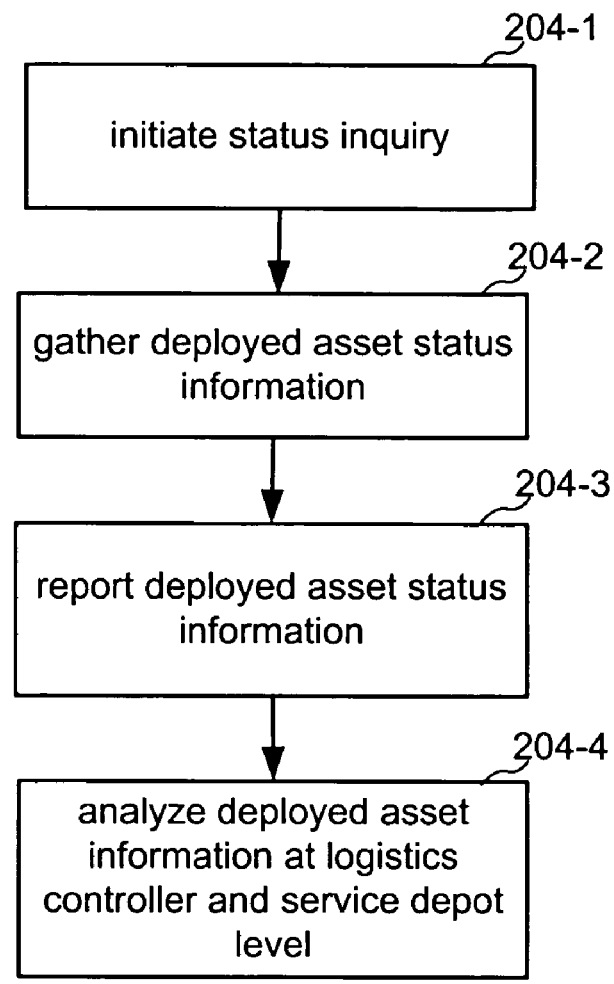
FIG. 9 provides a logic flow diagram to illustrate the process wherein a logistics controller initiates further inquiries on the status of the deployed asset that may involve fault detection, diagnostics, or troubleshooting in accordance with the present invention.

FIG. 9 further details step 204 where additional analysis or information is required to properly process the deployed asset information. This may involve the initiation of a status query in step 204-1. This status query is relayed by the OTH communication system or other augmenting communicating system to the deployed asset. In step 204-2, the deployed asset status information is gathered in response to the status inquiry. This gathered deployed asset status information is then reported back to the logistics controller or servicing depot in step 204-3. Further analysis is performed on the deployed asset information at the logistics controller and service depot level in step 204-4.

In summary, the present invention provides a real-time statistics management system operable to simultaneously support numerous deployed assets such as tactical aircraft, land based vehicles, naval assets, as well as personnel, and commercial enterprises, such as commercial aircraft, commercial trucking, railroad transportation systems, naval vessels and other like systems known to those skilled in the art. The present invention may be applied to non-military applications such as emergency response teams or the management of emergency response equipment and the upkeep of their assets. Maintenance details are relayed to a maintenance facility controller before the arrival of the asset to be serviced at the facility or the arrival of the servicing unit at a stationary facility or mobile asset that requires service in the field. Assets may report their position and status information when specific events occur. This allows servicing activities to more easily locate and service assets in the field that are unable to return to the servicing depot. This allows the servicing activity to collect the necessary tools, parts, support equipment, manpower, and workspace to service the asset upon arrival or in the field. Asset data or status information is forwarded to the servicing activity via an OTH communication service, such as a satellite service, which may be augmented by a LOS communication service. This allows the service activity to be notified of an event prior to the arrival of the asset.

Additionally, re-supply of inventory and other resources with the servicing activity can be automated for parts, fuel, ammunitions, countermeasures, etc. For example, should a specific part be required for needed service that is not in local inventory at the service depot, the part can be automatically ordered and shipped to the serving depot. Alternatively, the asset may be directed to an alternate servicing depot that has the part or necessary resources on hand. This avoids the need for post operation data downloads from the asset to retrieve status information associated with the consumables after arrival. Analysis of the deployed asset status information allows fault isolation, diagnostic, or queries to be initiated by the servicing activity while the asset is in operation in order to properly diagnose faults while still operating in the field. Additionally, maintenance workers may communicate with the crew of the asset via audio, video, or data exchanges.

In addition to staging the necessary materials to service the asset, the maintenance facility may automatically gather electronic documents regarding the work packages, training, and other required documentation and technical information to support the assigned maintenance workers in servicing the asset at the service depot. This increases the productivity of the service depot by often eliminating the need to conduct time consuming downloads and inventories of consumables and expendables within the asset upon arrival as well as troubleshooting and diagnostics to be conducted on the asset upon arrival. By automating and performing these tasks prior to the arrival of the asset at the service depot, productive utilization of personnel and resources can be achieved to sustain operations utilizing the asset. Furthermore, should the servicing activity be over subscribed, as determined by the analysis of the asset information and servicing activity workload, the deployed asset can be redirected to another servicing activity or the workload of the servicing activity can be reprioritized and distributed. This allows the logistics controller to balance the workload of several servicing activities.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A real-time logistics management system operable to support a plurality of deployed assets, comprising:
    a reporting system located within each deployed asset, wherein the reporting system is operable to monitor and report the deployed asset's onboard system statuses;
    an over-the-horizon (OTH) communication system communicatively coupled to the reporting system;
    an information distribution node communicatively coupled to the OTH communication system, wherein the OTH communication system is operable to communicate deployed asset status information from the asset monitoring system to the information distribution node; and
    a logistics system operable to:
        receive deployed asset status information from the information distribution node;
        allocate resources to service the deployed asset based on the received asset status information, wherein the allocation of resources is coordinated at a service depot prior to the arrival of the deployed asset at the service depot.

2. The real-time logistics management system of claim 1, wherein the OTH communication system comprises at least one deployed satellite communications (SATCOM) transceiver operable coupled to the reporting system, wherein the at least one deployed SATCOM transceiver is operable to perform two-way communications with a SATCOM service.

3. The real-time logistics management system of claim 1, wherein the reporting system comprises:
    an interface unit operably coupled to the at least one deployed SATCCM transceiver;
    onboard sensors operable to monitor the deployed asset's onboard system statuses; and
    a computer processor operable to execute instructions to:
        gather the deployed asset's onboard system statuses from the onboard sensors; and
        send the deployed asset's onboard system statuses to the information distribution node.

4. The real-time logistics management system of claim 3, wherein the reporting system is further operable to:
    receive status inquiries initiated by the logistics system regarding the deployed asset's onboard system statuses;
    gather the deployed asset's onboard system statuses in response to the status inquiry; and
    respond to the status inquiry with the deployed asset's onboard system statuses.

5. The real-time logistics management system of claim 3, wherein the reporting system is further operable to:
    detect fault conditions within the deployed asset; and
    report the fault conditions within the deployed asset status information.

6. The real-time logistics management system of claim 3, wherein the reporting system is further operable to exchange real-time two-way audio and/or visual communications with the logistics system.

7. The real-time logistics management system of claim 3, wherein the reporting system is further operable to:
    receive status inquiries initiated by the logistics system regarding the deployed asset's onboard system statuses;
    conduct diagnostics of the deployed asset in response to the status inquiries;
    gather the deployed asset's onboard system statuses in response to the diagnostics; and
    respond to the status inquiry with the deployed asset's onboard system statuses.

8. The real-time logistics management system of claim 3, wherein the OTH communication system is augmented with a line-of-site (LOS) communication system.

9. The real-time logistics management system of claim 2, wherein the at least one deployed SATCOM transceiver comprises a commercial off-the-shelf transceiver.

10. The real-time logistics management system of claim 2, wherein:
the OTH communications system further comprises an intercom; and
the reporting system further comprises a sound-card operably coupler to the computer processor and the intercom, wherein the sound-card is operable to service two-way audio and data communications.

11. The real-time logistics management system of claim 1, wherein the deployed asset status information comprises:
consumable status information;
expendable status information; and
asset sub-system status information.

12. The real-time logistics management system of claim 1, wherein the logistics system is operable to:
prioritize resources to service the deployed asset before the deployed asset returns to the service depot;
stage resources to service the deployed asset at the service before the deployed asset returns to the service depot; and initiate re-supply of the depot based on resources utilized by the deployed asset.

13. The real-time logistics management system of claim 12, wherein staging resources to service the deployed asset at the service before the deployed asset returns to the service depot further comprises:
generating work packages to service the deployed asset;
prioritizing and scheduling physical resources to service the deployed asset; and
prioritizing and scheduling manpower to service the deployed asset.

14. The real-time logistics management system of claim 1, wherein the deployed asset comprises:
a tactical aircraft;
a tactical land vehicle; and/or
a tactical naval vehicle.

15. A logistics management system comprising:
an information distribution node communicatively coupled to an over-the-horizon (OTH) communication system, wherein the OTH communication system is operable to receive deployed asset status information from reporting systems within deployed assets;
a service depot operable to service the deployed assets; and
a logistics controller coupled to the information distribution node wherein the logistics controller is operable to:
receive deployed asset status information from the information distribution node;
analyze deployed asset status information from the information distribution node; and
allocate resources to service the deployed asset based on the received asset status information, wherein the allocation of resources is coordinated at the service depot prior to the arrival of the deployed asset at the service depot.

16. The logistics management system of claim 15, wherein the logistics controller is further operable to track historical deployed asset maintenance and provide preventative maintenance service recommendations to a user.

17. The logistics management system of claim 15, wherein the logistics controller is further operable to initiate status inquiries regarding the deployed asset's onboard system statuses.

18. The logistics management system of claim 15, wherein the logistics controller is further operable to:
detect fault conditions within the deployed asset from the deployed asset's onboard system statuses; and
determine corrective actions for the fault conditions; and
allocate resources to service the deployed asset based on the fault condition, wherein the allocation of resources is coordinated at a service depot prior to the arrival of the deployed asset at the service depot.

19. The logistics management system of claim 15, wherein the OTH communication system is operable to exchange real-time two-way data, audio and/or visual communications with the deployed asset.

20. The logistics management system of claim 15, wherein the OTH communication system is augmented with a line-of-site (LOS) communication system.

21. The logistics management system of claim 15, wherein the deployed asset status information comprises:
consumable status information;
expendable status information; and
asset sub-system status information.

22. The logistics management system of claim 15, wherein the logistics system is operable to:
prioritize resources to service the deployed asset before the deployed asset returns to a service depot;
stage resources to service the deployed asset at the service before the deployed asset returns to the service depot; and
initiate re-supply of the depot based or, resources utilized by the deployed asset.

23. The logistics management system of claim 22, wherein staging resources to service the deployed asset at the service depot before the deployed asset returns to the service depot further comprises:
generating work packages to service the deployed asset;
prioritizing and scheduling physical resources to service the deployed asset; and
prioritizing and scheduling manpower to service the deployed asset.

24. The logistics management system of claim 15, wherein the deployed asset comprises:
a tactical aircraft;
a tactical land vehicle; and/or
a tactical naval vehicle.

25. A method to service a plurality of deployed assets comprising:
gathering deployed asset status information with an onboard reporting system operably coupled to the deployed asset;
communicatively coupling the onboard reporting system and an information distribution node via an over-the-horizon (OTH) communication system;
communicatively coupling the information distribution node and a logistics controller, wherein deployed asset status information is exchanged between the logistics controller and the onboard reporting system via the information distribution node;
allocating resources to service the deployed asset based on the received deployed asset status information, wherein the allocation of resources is coordinated at a service depot prior to arrival of the deployed asset at the service depot.

26. The method of claim 25, wherein the OTH communication system comprises at least one deployed satellite communications (SATCOM) transceiver operable coupled to the reporting system, wherein the at least one deployed SATCOM transceiver is operable to perform two-way communications with a SATCOM service.

27. The method of claim 25, further comprising:
initiating status inquiries with the logistics controller regarding the deployed asset status information;
gathering the deployed asset status information in response to the status inquiry; and
communicating the deployed asset status information to the logistics controller.

28. The method of claim 25, further comprising:
detecting fault conditions within the deployed asset; and
reporting the fault conditions within the deployed asset status information to the logistics controller.

29. The method of claim 25, further comprising the exchange of real-time two-way data, audio and/or visual communications between the deployed asset and the service depot.

30. The method of claim 25, further comprising:
receiving status inquiries initiated by the logistics system regarding the deployed asset status information;
conducting diagnostics of the deployed asset in response to the status inquiries;
gathering the deployed asset status information in response to the diagnostics; and
responding to the status inquiry with the deployed asset status information.

31. The method of claim 25, further comprising augmenting the OTH communication system with a line-of-site (LOS) communication system.

32. The method of claim 25, wherein the deployed asset status information comprises:
consumable status information;
expendable status information; and
asset sub-system status information.

33. The method of claim 25, further comprising:
prioritizing resources to service the deployed asset before the deployed asset returns to a service depot;
staging resources to service the deployed asset at the service before the deployed asset returns to the service depot; and
initiating re-supply of the service depot based on resources utilized by the deployed asset.

34. The method of claim 33, further comprising:
generating work packages to service the deployed asset;
prioritizing and scheduling physical resources to service the deployed asset; and
prioritizing and scheduling manpower to service the deployed asset.

35. The method of claim 25, wherein the deployed asset comprises:
a tactical aircraft;
a tactical unit;
a tactical land vehicle; and/or
a tactical naval vehicle.

* * * * *